United States Patent
Chen et al.

(10) Patent No.: US 10,928,234 B2
(45) Date of Patent: Feb. 23, 2021

(54) TOOL, CONTAINER AND METHOD FOR EXTRACTING LIQUID

(71) Applicant: BEIJING RED-SEA TECH CO., LTD., Beijing (CN)

(72) Inventors: Zengxin Chen, Beijing (CN); Shenglu Li, Beijing (CN); Rui Li, Beijing (CN); Jiaming Wei, Beijing (CN); Jingzhe Chen, Beijing (CN); Chen Li, Beijing (CN); Chen Chen, Beijing (CN); Hao Wei, Beijing (CN)

(73) Assignee: BEIJING RED-SEA TECH CO., LTD., Beijing (CN)

( * ) Notice: Subject to any disclaimer, the term of this patent is extended or adjusted under 35 U.S.C. 154(b) by 240 days.

(21) Appl. No.: 16/313,422

(22) PCT Filed: Jun. 28, 2017

(86) PCT No.: PCT/CN2017/090667
§ 371 (c)(1),
(2) Date: Dec. 26, 2018

(87) PCT Pub. No.: WO2018/001286
PCT Pub. Date: Jan. 4, 2018

(65) Prior Publication Data
US 2020/0309584 A1 Oct. 1, 2020

(30) Foreign Application Priority Data

Jun. 28, 2016 (CN) .......................... 201610493592.4
Jun. 28, 2016 (CN) .......................... 201620662782.X

(51) Int. Cl.
*G01F 11/02* (2006.01)
*B65D 83/00* (2006.01)
*G01F 11/16* (2006.01)

(52) U.S. Cl.
CPC ........ *G01F 11/024* (2013.01); *B65D 83/0022* (2013.01); *G01F 11/16* (2013.01)

(58) Field of Classification Search
CPC ...... G01F 11/38; G01F 11/021; G01F 11/024; G01F 11/16; B65D 25/56; B65D 83/00;
(Continued)

(56) References Cited

U.S. PATENT DOCUMENTS

| 4,348,160 A | 9/1982 | Heyneman |
| 5,127,547 A | 7/1992 | Gerich |

(Continued)

FOREIGN PATENT DOCUMENTS

| CN | 202449415 U | 9/2012 |
| CN | 105015918 A | 11/2015 |

(Continued)

OTHER PUBLICATIONS

International Search Report from PCT/CN2017090667, dated Oct. 10, 2017, with English translation from WIPO.
(Continued)

*Primary Examiner* — David P Angwin
*Assistant Examiner* — Bob Zadeh
(74) *Attorney, Agent, or Firm* — Ladas & Parry, LLP

(57) ABSTRACT

A tool, container and method for extracting a liquid; the tool for extracting a liquid comprises: a pressure-changing means, a liquid-reservoir space, a liquid-drawing channel and an outflow channel; the pressure-changing means comprises a cylinder and a piston capable of moving back and forth in the cylinder; the back-and-forth movement of the piston causes positive and negative pressure changes in the cylinder; a start end of the liquid-reservoir space is in communication with the inside of the cylinder; a temporary liquid-storage groove or an opening is provided on a wall of the cylinder at a horizontal position below a port of the start
(Continued)

end of the liquid-reservoir space; the volume of the maximum sealing portion of the cylinder is greater than the volume of the liquid-reservoir space; the liquid-drawing channel communicates with the liquid-reservoir space; the outflow channel communicates with a tail end of the liquid-reservoir space.

9 Claims, 14 Drawing Sheets

(58) Field of Classification Search
CPC .... B65D 83/0022; B65D 25/38; B65D 81/24; B65D 81/245; F16K 15/02; F16K 11/0716; F16K 17/0473
See application file for complete search history.

(56) References Cited

U.S. PATENT DOCUMENTS

| | | | | |
|---|---|---|---|---|
| 2012/0241467 | A1* | 9/2012 | Wiek | B65D 83/52 |
| | | | | 222/1 |
| 2013/0153605 | A1* | 6/2013 | Chen | G01F 11/023 |
| | | | | 222/209 |
| 2014/0326757 | A1* | 11/2014 | Chen | B65D 83/42 |
| | | | | 222/209 |
| 2015/0183570 | A1* | 7/2015 | Chen | B65D 25/28 |
| | | | | 220/661 |
| 2015/0240959 | A1* | 8/2015 | Chen | F16K 15/02 |
| | | | | 222/1 |
| 2016/0002023 | A1* | 1/2016 | Chen | B67D 7/36 |
| | | | | 222/1 |
| 2018/0180458 | A1* | 6/2018 | Chen | G01F 11/38 |

FOREIGN PATENT DOCUMENTS

| | | | | |
|---|---|---|---|---|
| CN | 105236025 | A | 1/2016 | |
| CN | 205150711 | U | 4/2016 | |
| CN | 105966782 | A | 9/2016 | |
| CN | 205952722 | U | 2/2017 | |
| EP | 2902340 | A1 | 9/2013 | |
| JP | 2011051602 | A | 3/2011 | |
| WO | WO 2014048341 | A1* | 4/2014 | ............ B65D 25/38 |

OTHER PUBLICATIONS

Written Opinion of the International Searching Authority from PCT/CN2017090667, dated Oct. 10, 2017, with English translation from WIPO.

International Preliminary Report on Patentability from PCT/CN2017090667, dated Jan. 1, 2019, with English translation from WIPO.

Extended European Search Report from EP app. No. 17819283.7, dated Mar. 23, 2020.

* cited by examiner

TOOL, CONTAINER AND METHOD FOR EXTRACTING LIQUID

CROSS-REFERENCE TO RELATED APPLICATIONS

The present application is the U.S. national phase of PCT/CN2017/090667 filed on Jun. 28, 2017, which claims the priority to the Chinese Patent Application No. 201610493592.4 filed on Jun. 28, 2016, and the Chinese patent application No. 201620662782.X filed on Jun. 28, 2016, the disclosures of which are incorporated herein by reference in their entireties.

BACKGROUND

Technical Field

The present invention relates to a tool, container, and method for extracting liquid, and in particular, to a tool for extracting liquid having a pneumatic cylinder structure, a liquid container, and a method capable of extracting liquid.

Related Art

There are many occasions of using liquid in work and life, for example, extracting various reagents, liquid pesticide, chemical raw materials, cleaning solutions, disinfectant solutions, edible oil, liquid medicine, and the like. In addition to manually extracting liquid, in some cases (such as an intelligent kitchen system or a cooking robot), liquid needs to be extracted automatically or electrically.

A volume of extracted liquid is usually required when the liquid is used, for example, measured-volume extraction, limited-volume extraction, determined-volume extraction, or estimated-volume extraction. Recently, the foregoing measured-volume extraction, limited-volume extraction, determined-volume extraction, or estimated-volume extraction problem is resolved by new technologies such as a self-measuring container. When a container having a self-measuring function holds the foregoing liquid, during extraction, no external measuring tool is needed, so that disadvantages, such as being externally contaminated, can be avoided.

However, when liquid is extracted by using an existing self-measuring container, because of impact of factors such as an operating force, an operating speed, a volume of liquid inside a container body, and a volume of air inside a pressure variation component, it is difficult to determine an initial position of the liquid. If the initial position for measurement cannot be determined, not only precision of a volume of extracted liquid is interfered with, but also operating convenience is affected. The above all hinder wide promotion and application of containers having a self-measuring function.

In people's life, a technology of initially positioning to-be-extracted liquid is needed, to make each extraction process accurate and convenient and prevent extracted liquid from being externally contaminated as much as possible.

SUMMARY

To resolve the foregoing problem existing in the prior art, the present invention provides a tool for extracting liquid, including a pressure variation apparatus, a liquid storage space, a liquid suction passage, and an outflow passage, where:

the pressure variation apparatus includes a pneumatic cylinder and a piston capable of reciprocating inside the pneumatic cylinder; the piston reciprocates to generate positive and negative pressure variations inside the pneumatic cylinder; a starting end of the liquid storage space is in communication with an interior of the pneumatic cylinder;

a temporary storage groove or an opening is arranged on the pneumatic cylinder wall whose horizontal position is lower than a port of the starting end of the liquid storage space;

a maximum volume of a sealed part of the pneumatic cylinder is larger than a volume of the liquid storage space;

the liquid suction passage is in communication with the liquid storage space, and a valve capable of being opened toward a direction of the liquid storage space and being closed toward an opposite direction is disposed inside the liquid suction passage; and the outflow passage is in communication with a tail end of the liquid storage space, and a valve capable of being opened toward a direction of an external space and being closed toward an opposite direction is disposed inside the outflow passage.

For such a tool for extracting liquid, an extraction process includes at least two pressure variation stages in the pneumatic cylinder:

1. Negative Pressure Stage

The piston is moved outward from the pneumatic cylinder to generate negative pressure, so that liquid enters and fills up the liquid storage space through the liquid suction passage, and excess liquid flows from the liquid storage space into the pneumatic cylinder, to complete initial positioning of liquid in the liquid storage space.

2. Positive Pressure Stage

The piston is moved inward, and positive pressure is generated inside the pneumatic cylinder, so that the liquid in the liquid storage space flows out through the outflow passage.

In cases, such as that the tool for extracting liquid is provided with an opening, a balancing stage, that is, a stage of communicating the interior of the pneumatic cylinder with the outside through the opening, is further included after the negative pressure stage. After the negative pressure stage, when the piston continuously moves to exceed the opening until the opening can communicate the interior of the pneumatic cylinder with the outside, pressure inside the pneumatic cylinder is the same as pressure outside the pneumatic cylinder. Excess liquid stops entering into the pneumatic cylinder, and excess liquid that enters into the pneumatic cylinder flows out through the opening. A stage in which the opening communicates the interior of the pneumatic cylinder with the outside before the positive pressure stage is also a balancing stage, so that excess liquid that enters into the pneumatic cylinder can also flow out through the opening.

Such a tool for extracting liquid has a relatively simple structure, can be produced in a large scale, and can reduce production costs. When the tool for extracting liquid is used, content can be extracted conveniently and quickly. The tool for extracting liquid provides a quick response and a good operating sense. The tool for extracting liquid can perform initial positioning, and accurately measures a volume, limits a volume, determines a volume, or estimates a volume. When a volume of liquid that flows out from the liquid storage space is determined, a liquid surface (an interface between liquid and air) produces an indication effect. Such a tool for extracting liquid overcomes advantageous, such as inconvenience and inaccuracy, existing in liquid extraction in the prior art.

In such a tool for extracting liquid, functions of the opening include: 1. leading excess liquid that enters into the pneumatic cylinder out of the pneumatic cylinder; and 2. breaking tightness of the pneumatic cylinder timely, to prevent too much excess liquid from continuously entering the pneumatic cylinder. The opening is located on an inner surface of the pneumatic cylinder, or is an axial notch running through the pneumatic cylinder wall, or is a gap between piston motion supports.

In such a tool for extracting liquid, a temporary storage groove is a groove on an inner pneumatic cylinder wall, and when the temporary storage groove is located at the sealed part of the pneumatic cylinder, the temporary storage groove can temporarily store excess liquid that enters into the pneumatic cylinder. When the temporary storage groove is located outside the sealed part, liquid inside the temporary storage groove flows out under the action of gravity or as being swung by an operator. The temporary storage grooves are radially annularly arranged on an inner surface of the pneumatic cylinder, or are discretely distributed on an inner surface of the pneumatic cylinder.

In such a tool for extracting liquid, the starting end of the liquid storage space may be in communication with the interior of the pneumatic cylinder through an inverted-U-shaped pipe. When a relevant valve is not tightly closed, an aperture of a pipe is too large, or the like, the inverted-U-shaped structure can prevent air from entering a measuring passage.

In such a tool for extracting liquid, the port of the starting end of the liquid storage space may be upward. The port being upward is convenient for observation, can also prevent air from entering into the liquid storage space, and helps improve precision of measuring a volume (including determining a volume and estimating, a volume).

In such a tool for extracting liquid, the liquid storage space may be a pipe marked with a volume scale or a space having a determined capacity. If the liquid storage space is a pipe marked with a volume scale, measured-volume extraction can be implemented, and if the liquid storage space is a space having a determined capacity, determined-volume extraction and limited-volume extraction can alternatively be implemented.

For such a tool for extracting liquid, the piston may be connected to an elastic component that returns the piston to its original position. The piston being connected to an elastic component that returns the piston to its original position, in a case, can enable, after positive-pressure extraction, the piston to automatically return to its original position, generate negative pressure, to fill up the liquid storage space with liquid, automatically complete initial positioning, and get ready for next measured-volume extraction.

For such a tool for extracting liquid, the piston may be connected to an electrically-driven apparatus. The electrically-driven apparatus can perform a piston driving operation under positive pressure or negative pressure. The electrically-driven apparatus can cooperate with another part of an intelligent kitchen system or a cooking robot, to complete a task of accurately extracting or delivering a liquid material.

The present invention further relates to a liquid container, including a container body, a pressure variation apparatus, a liquid storage space, a liquid suction passage, and an outflow passage, where:

the pressure variation apparatus includes a pneumatic cylinder and a piston capable of reciprocating inside the pneumatic cylinder; the piston reciprocates to generate positive and negative pressure variations inside the pneumatic cylinder; a starting end of the liquid storage space is in communication with an interior of the pneumatic cylinder;

a temporary storage groove or an opening is arranged on the pneumatic cylinder wall whose horizontal position is lower than a port of the starting end of the liquid storage space:

a maximum volume of a sealed part of the pneumatic cylinder is larger than a volume of the liquid storage space;

the liquid suction passage is in communication with the liquid storage space, and a valve capable of being, opened toward a direction of the liquid storage space and being closed toward an opposite direction is disposed inside the liquid suction passage; and the outflow passage is in communication with a tail end of the liquid storage space, and a valve capable of being opened toward a direction of an external space and being closed toward an opposite direction is disposed inside the outflow passage.

For such a liquid container, excess liquid inside the pneumatic cylinder may be lead into the container body through a liquid guide pipe. The liquid inside the pneumatic cylinder flows back into the container body, and can be extracted and used again, so that the liquid that flows back can be prevented from being wasted or causing contamination.

The present invention also relates to a method for extracting liquid, including, the following steps:

A. pulling a piston of a pneumatic cylinder outward, to generate negative pressure, to enable the pneumatic cylinder to apply negative pressure into a liquid storage space in communication with an upper part of the pneumatic cylinder, so that liquid enters into the liquid storage space through a liquid suction passage provided with a valve capable of being opened toward a direction of the liquid storage space and being closed toward an opposite direction;

B. after the liquid storage space is filled up with the liquid, departing, by excess liquid, from the liquid storage space to enter into the pneumatic cylinder;

C. continuously pulling the piston, to enable the piston to exceed a position of an opening on a pneumatic cylinder wall, where the pneumatic cylinder is in communication with air outside through the opening, excess liquid inside the liquid storage space no longer enters the pneumatic cylinder, and the excess liquid inside the pneumatic cylinder flows out through the opening; and the position of the opening makes a maximum volume of a sealed part of the pneumatic cylinder larger than a volume of the liquid storage space;

D. pushing the piston inside the pneumatic cylinder inward, to enable the piston to move in an opposite direction to exceed the position of the opening, so that the pneumatic cylinder is isolated from the outside; and E. continuously pushing the piston to compress the pneumatic cylinder, to apply positive pressure into the liquid storage space, so that liquid inside the liquid storage space flows out through an outflow passage provided with a valve capable of being opened toward a direction of an external space and being closed toward an opposite direction, where a volume of the liquid that flows out is determined by using a position of a liquid surface inside the liquid storage space.

The present invention also relates to another method for extracting liquid, including the following steps:

A. pulling a piston of a pneumatic cylinder outward, to generate negative pressure, to enable the pneumatic cylinder to apply negative pressure into a liquid storage space in communication with an upper part of the pneumatic cylinder, so that liquid enters into the liquid storage space through a liquid suction passage provided with a valve capable of being opened toward a direction of the liquid storage space and being closed toward an opposite direction;

B. after the liquid storage space is filled up with the liquid, departing, by excess liquid, from the liquid storage space to enter into the pneumatic cylinder;

C. when the piston exceeds a position of a temporary storage groove disposed on a pneumatic cylinder wall, entering, by the excess liquid inside the pneumatic cylinder, into the temporary storage; and stopping pulling the piston, where excess liquid no longer enters the pneumatic cylinder;

the position of the temporary storage groove makes a maximum volume of a sealed part of the pneumatic cylinder larger than a volume of the liquid storage space;

D. pushing the piston inside the pneumatic cylinder inward, to enable the piston to move in an opposite direction to exceed the position of the temporary storage groove, where liquid inside the temporary storage groove flows out; and E. continuously pushing the piston to compress the pneumatic cylinder, to apply positive pressure into the liquid storage space, so that liquid inside the liquid storage space flows out through an outflow passage provided with a valve capable of being opened toward a direction of an external space and being closed toward an opposite direction, where a volume of the liquid that flows out is determined by using a position of a liquid surface inside the liquid storage space.

In the two methods for extracting a liquid by measuring a volume, operation is simple, usage is convenient, and volume measuring (including volume determining and volume estimating) is accurate. The two methods are applicable to daily use by common people, and are also applicable to use in precise measurement performed by scientific research personnel. Pushing and pull operations can be performed manually or electrically driven.

DETAILED DESCRIPTION

Embodiment 1

Figure 1:
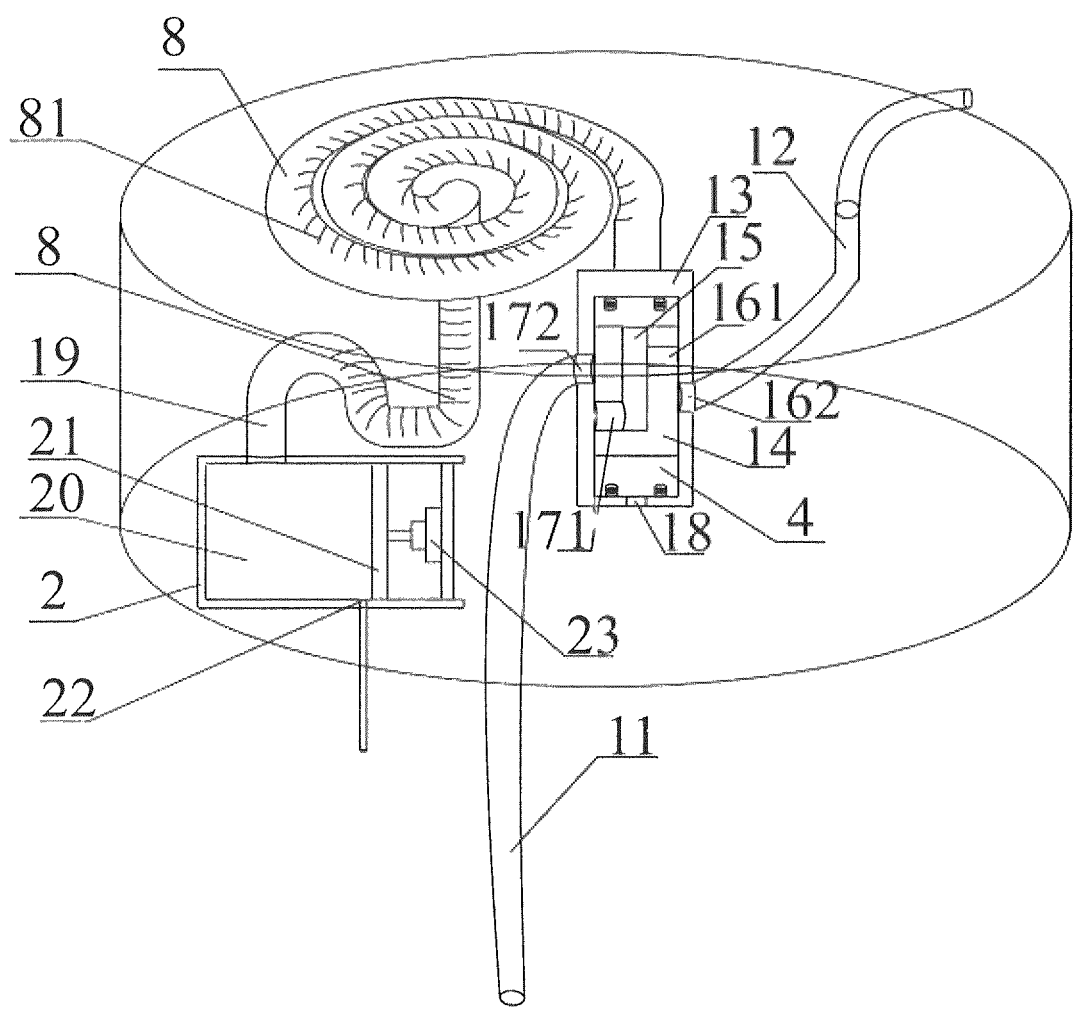
FIG. 1 is a schematic structural diagram of a tool for extracting liquid according to Embodiment 1.

FIG. 1 is a schematic structural diagram of a tool for extracting liquid according to Embodiment 1. The tool for extracting liquid includes a pressure variation apparatus, a liquid storage space 8, a liquid suction passage 11, and an outflow passage 12. An end of the outflow passage 12 is in communication with an interface 162 on a valve body 13 of a control valve, and the other end is an outflow port. An end of the liquid suction passage 11 is connected to an interface 172 on the valve body 13 of the control valve, and the other end is a liquid extraction port.

The pressure variation apparatus includes a pneumatic cylinder 20 and a piston 21. Reciprocation of the piston 21 can increase and reduce pressure inside the pneumatic cylinder 20. The pneumatic cylinder wall 2 is provided with an opening 22 running through the pneumatic cylinder wall. When the piston 21 is located at a position of the opening 22, a volume of a sealed part inside the pneumatic cylinder 20 is larger than a volume of the liquid storage space 8. The piston 21 is connected to an electric apparatus 23. An initial end of the liquid storage space 8 is a pipe 19, and the pipe 19 is in communication with the pneumatic cylinder 20. The pipe 19 is in an inverted-U shape, and a port of the initial end of the liquid storage space 8 is upward.

The other end of the liquid storage space 8 is connected to the control valve including the valve body 13 and a valve core 14, and is in communication with a middle passage 15 inside the valve core 14. The valve body 13 of the control valve is externally connected to 3 passages: the liquid suction passage 11, the outflow passage 12, and the liquid storage space 8. The valve core 14 of the control valve is located inside an internal cavity of the valve body 13, and can slide vertically inside the cavity, but a space between an outer circumferential side of the valve core 14 and an inner wall of the valve body 13 is provided with a liquid-tight seal. The is a middle passage 15 inside the valve core 14, and the middle passage 15 has an interface 161 and an interface 171 on an outer circumferential side face of the valve core. An interface 162 and the interface 172 are disposed on the valve body. The interface 162 is in communication with the outflow passage 12, and the interface 172 is in communication with the liquid suction passage 11.

According to different positions of the valve core 13 inside the valve body 14 during reciprocation. The interface 161 and the interface 162, as well as the interface 171 and the interface 172 have 3 different communication relationships: only the interface 161 and the interface 162 are in communication with each other; neither the interface 161 and the interface 162 nor the interface 171 and the interface 172 are in communication with either other (a state shown in FIG. 1); and only the interface 171 and the interface 172 are in communication with each other. A spring is mounted on either end of the valve body 13, and the spring can locate, in absence of external pressure, the valve core 14 at a position that makes neither the interface 161 and the interface 162 nor the interface 171 and the interface 172 in communication. A pressure relief port 18 is disposed at a lower end of the valve body 13.

An outflow port of the outflow passage 12 is located outside the measuring tool.

Steps of measuring and extracting liquid by using such a measuring tool are as follows:

When the opening 22 is located on a left side of the piston 21, the electric apparatus 23 is started, to pull the piston 21 outward, to reduce pressure inside the pneumatic cylinder 20. Pressure inside the liquid storage space 8 is negative pressure.

The valve core 14 of the control valve moves upward under the action of negative pressure. The interface 171 is in communication with the interface 172, so that the liquid suction passage 11 is in communication with the liquid storage space 8 through the middle passage 15. Liquid enters into the liquid storage space 8 under the action of negative pressure. After filling up the liquid storage space 8, content flows into the pneumatic cylinder 20 through the pipe 19.

When the piston 21 moves to a right side of the opening 22, an interior of the pneumatic cylinder 20 is in communication with the outside, negative pressure is absent, and liquid inside the liquid storage space 8 stops flowing. The valve core 14 moves vertically under the action of the spring on an upper end of valve body 13. The interface 161 and the interface 162, as well as the interface 171 and the interface 172, are all located at disconnected positions. Liquid inside the pipe 19 flows into the pneumatic cylinder 20 under the action of gravity. Liquid inside the pneumatic cylinder 20 flows out of the pneumatic cylinder 20 through the opening 22 under the action of gravity. Initial positioning of liquid inside the liquid storage space 8 is completed.

When measured-volume extraction is needed, the electric apparatus 23 is started to push the piston 21 leftward, to enable the piston 21 to exceed the opening 22 to increase pressure inside the pneumatic cylinder 20. Pressure inside the liquid storage space 8 is positive pressure.

The valve core 14 of the control valve moves downward under the action of positive pressure. The interface 161 is in communication with the interface 162, so that the outflow passage 12 is in communication with the liquid storage space 8 through the middle passage 15. Liquid flows out of the liquid storage space 8 through the outflow passage 12 under the action of positive pressure. A scale 81 corresponding to a liquid surface inside the liquid storage space 8 can indicate a volume of liquid that flows out.

Compared with a conventional tool for extracting liquid, such a measuring tool is convenient, fast, and accurate.

Embodiment 2

Figure 2:
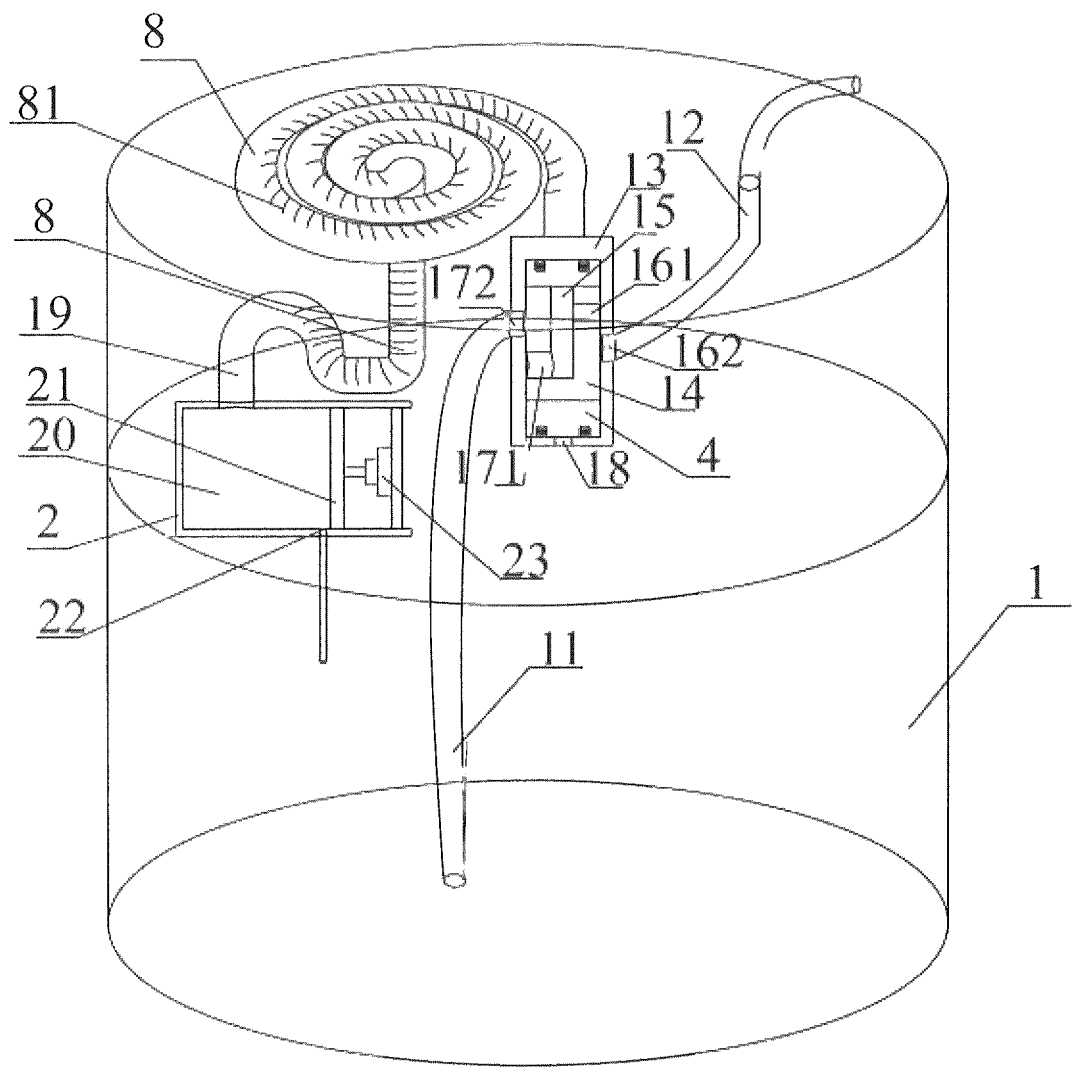
FIG. 2 is a schematic structural diagram of a liquid container according to Embodiment 2.

FIG. 2 is a schematic structural diagram of a liquid container according to Embodiment 2. In the container, a container body 1 for accommodating liquid is added to the tool for extracting liquid of Embodiment 1.

Such a container can directly measure and extract liquid inside the container body 1 without using an external tool, so that the liquid inside the container is rarely in contact with external air, is not oxidized, reduced, or contaminated by air or an external measuring tool, and is protected better. It is convenient, fast, and accurate to measure and extract internal liquid.

Embodiment 3

Figure 3:
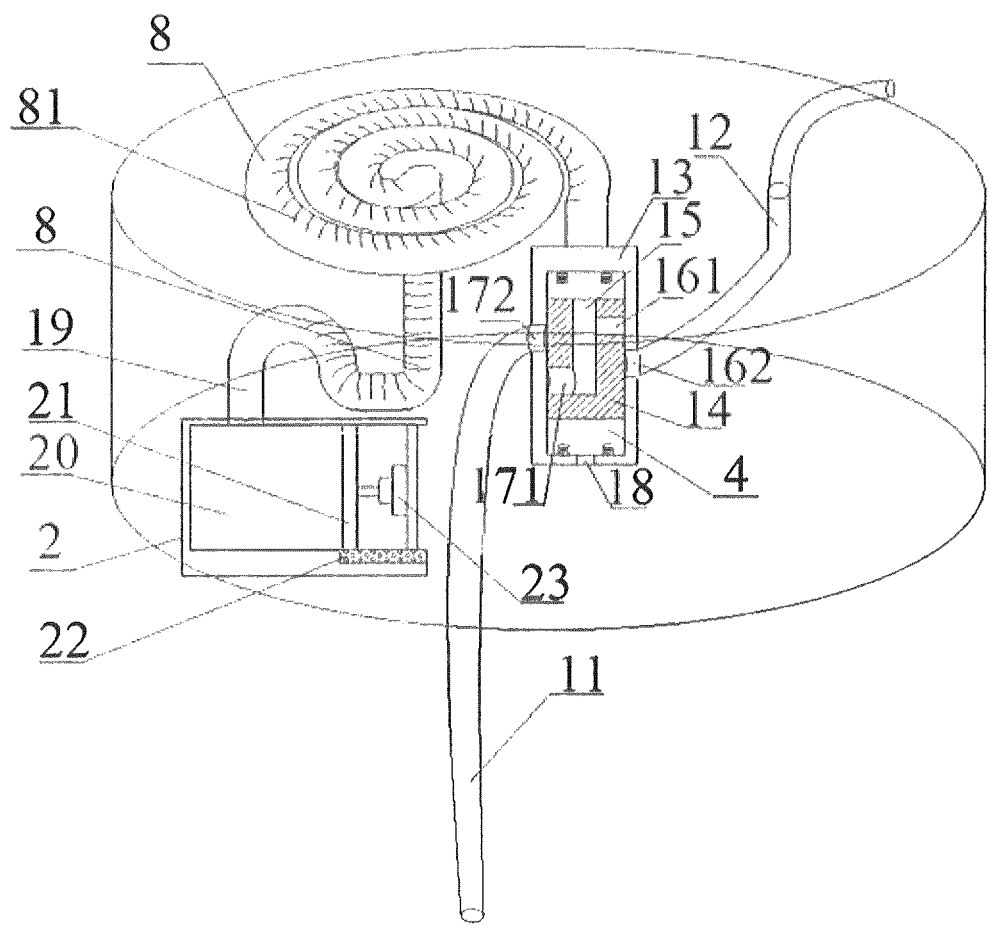
FIG. 3 is a schematic structural diagram of a tool for extracting liquid according to Embodiment 3.

FIG. 3 is a schematic structural diagram of a tool for extracting liquid according to Embodiment 3. The measuring tool includes a pressure variation apparatus, a liquid storage space 8, a liquid suction passage 11, and an outflow passage 12.

The pressure variation apparatus includes a pneumatic cylinder 20 and a piston 21. Reciprocation of the piston 21 can increase and reduce pressure inside the pneumatic cylinder 20. An opening 22 is arranged on a pneumatic cylinder wall 2 at a position proximal to a left side on a lower part of the pneumatic cylinder, and the opening 22 is located on an inner surface of the pneumatic cylinder wall 2, and is parallel to an axis of the pneumatic cylinder 20. When the piston 21 is located at a position on a leftmost side of the opening 22, a volume of a sealed part inside the pneumatic cylinder 20 is larger than a volume of the liquid storage space 8. The piston 21 is connected to an electric apparatus 23. An initial end of the liquid storage space 8 is in communication with the pneumatic cylinder 20 through a pipe 19. The pipe 19 is in an inverted -U shape, and a port of the initial end of the liquid storage space 8 is upward.

Other structures of the measuring tool, for example, other parts, such as the outflow passage 12, the liquid suction passage 11, and the liquid storage space 8, are the same as those in Embodiment 1.

Steps of measuring and extracting liquid by using such a measuring tool are the same as those in Embodiment 1. A difference is that content that enters into the pneumatic cylinder 20 under the action of negative pressure flows out of the pneumatic cylinder 20 through the opening 22 instead of an opening and a liquid guide pipe. In this embodiment, the opening 22 has functions of both an opening and a liquid guide pipe, and not only can make air and liquid inside and outside the pneumatic cylinder 20 in communication with each other, but also can guide liquid to flow to a proper position.

Compared with a conventional tool for extracting liquid, such a measuring tool is convenient, fast, and accurate.

Embodiment 4

Figure 4:
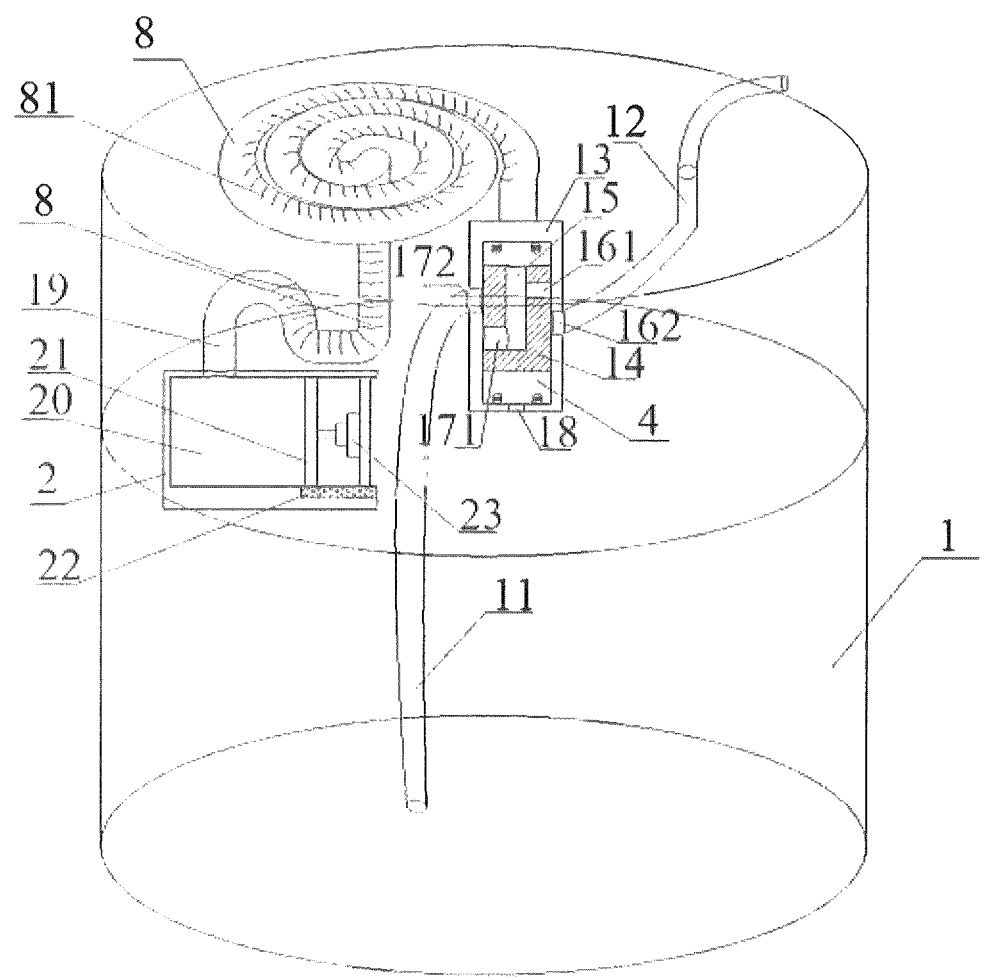
FIG. 4 is a schematic structural diagram of a liquid container according to Embodiment 4.

FIG. 4 is a schematic structural diagram of a liquid container according to Embodiment 4. In the container, a container body 1 for accommodating liquid is added to the tool for extracting liquid of Embodiment 3.

Such a container can directly measure and extract liquid inside the container body 1 without using an external tool, so that the liquid inside the container is rarely in contact with external air, is not oxidized, reduced, or contaminated by air or an external measuring tool, and is protected better. It is convenient, fast, and accurate to measure and extract internal liquid.

Embodiment 5

Figure 5:
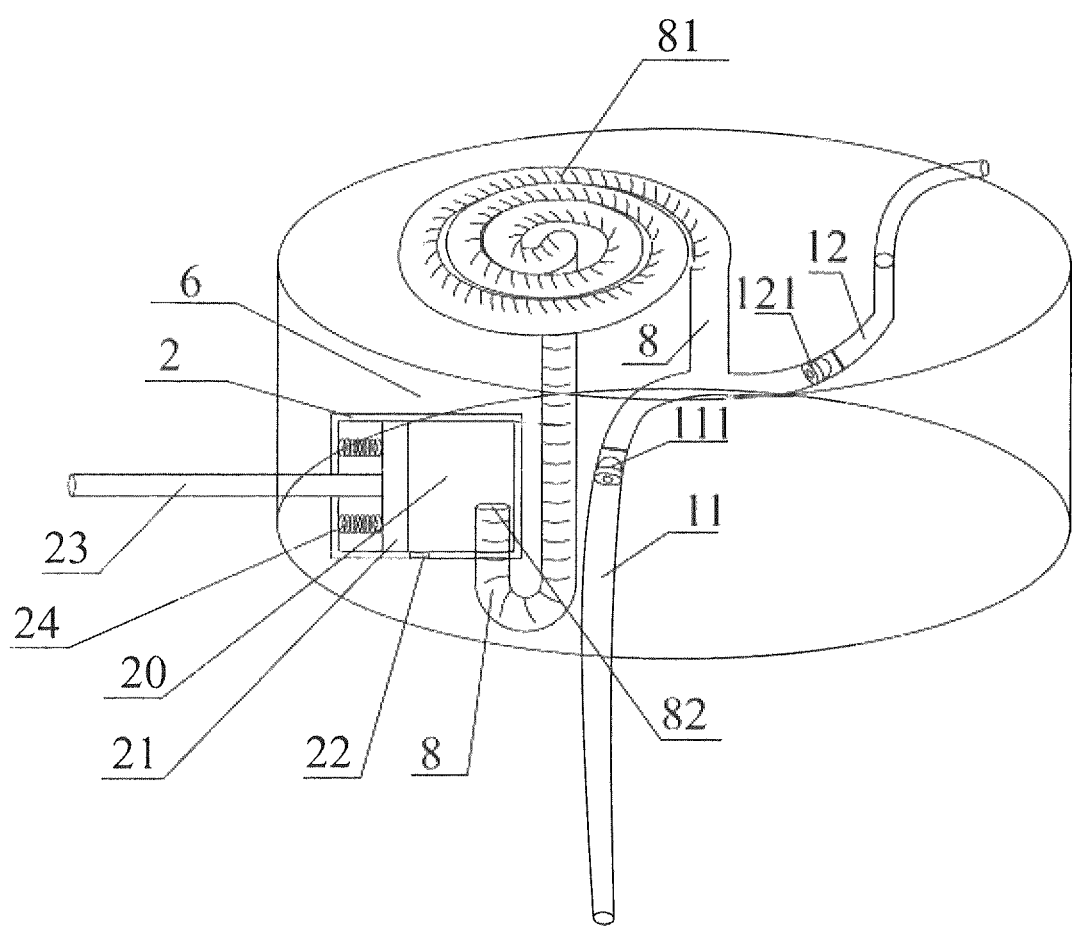
FIG. 5 is a schematic structural diagram of a tool for extracting liquid according to Embodiment 5.

FIG. 5 is a schematic structural diagram of a tool for extracting liquid according to Embodiment 5.

The measuring tool includes a pressure variation apparatus, a liquid storage space 8, a liquid suction passage 11, and an outflow passage 12. An end of the outflow passage 12 is connected to and in communication with the liquid suction passage 8, and the other end thereof is an outflow port. A one-way valve 121 capable of being opened toward a direction of the outflow port is disposed inside the passage. An end of the liquid suction passage 11 is in communication with the liquid storage space 8. and the other end thereof is a liquid extraction port. A one-way valve 111 capable of being opened toward a direction of the liquid storage space 8 is disposed inside the passage. The most part of the liquid storage space 8 is coiled on an upper surface of the measuring tool, has a scale 81, a port 82 of the other end is located inside the pneumatic cylinder 2, and the port 82 is upward. The liquid storage space 8 that is much longer than a length required for an actual connection improves accuracy in measurement.

The pressure variation apparatus is a component capable of increasing or reducing pressure inside the liquid storage space 8, and includes a pneumatic cylinder 20, a piston 21; and an opening 22 on a wall of the pneumatic cylinder 20. When the piston 21 is located at a position of the opening 22, a volume of a sealed part (that is, a volume of the pneumatic cylinder on a right side of the piston) inside the pneumatic cylinder 20 is larger than a volume of the liquid storage space 8. The piston 21 is connected to a pull rod 23. The pull rod 23 extends of the measuring tool. A spring 24 can return to its original position after the piston 21 deviates from a balancing point.

Steps of measuring and extracting liquid by using such a measuring tool are as follows:

When the piston 21 is on a right side of the opening 22, the spring 24 is stretched, and the piston 21 is pulled by the spring 24 to move toward a left side of the opening 22, to reduce pressure inside the pneumatic cylinder 2. Pressure inside the liquid storage space 8 is negative pressure. The one-way valve 121 is closed, the one-way valve 111 is opened, liquid enters into the liquid storage space 8 from the liquid suction passage 11, and after, the liquid storage space 8 is filled up, excess liquid enters into the pneumatic cylinder 2 through the port 82.

The piston 21 exceeds the opening 22, negative pressure inside the pneumatic cylinder 2 disappears, and liquid inside the liquid storage space 8 no longer flows, so that liquid storage space 8 completes initial positioning. Liquid inside the pneumatic cylinder 2 flows out through the opening 22.

During measured-volume extraction, the pull rod 23 is pushed rightward, and after exceeding the opening 22, the piston 21 increases pressure inside the pneumatic cylinder 2. Pressure inside the liquid storage space 8 is positive pressure. The one-way valve 111 is closed, the one-way valve 121 is opened, and liquid flows out along the outflow passage 12. A scale 81 corresponding to a liquid surface inside the liquid storage space 8 is observed, and a volume of liquid that flows out is read.

Such a measuring tool is also convenient, fast, and accurate.

Embodiment 6

Figure 6:
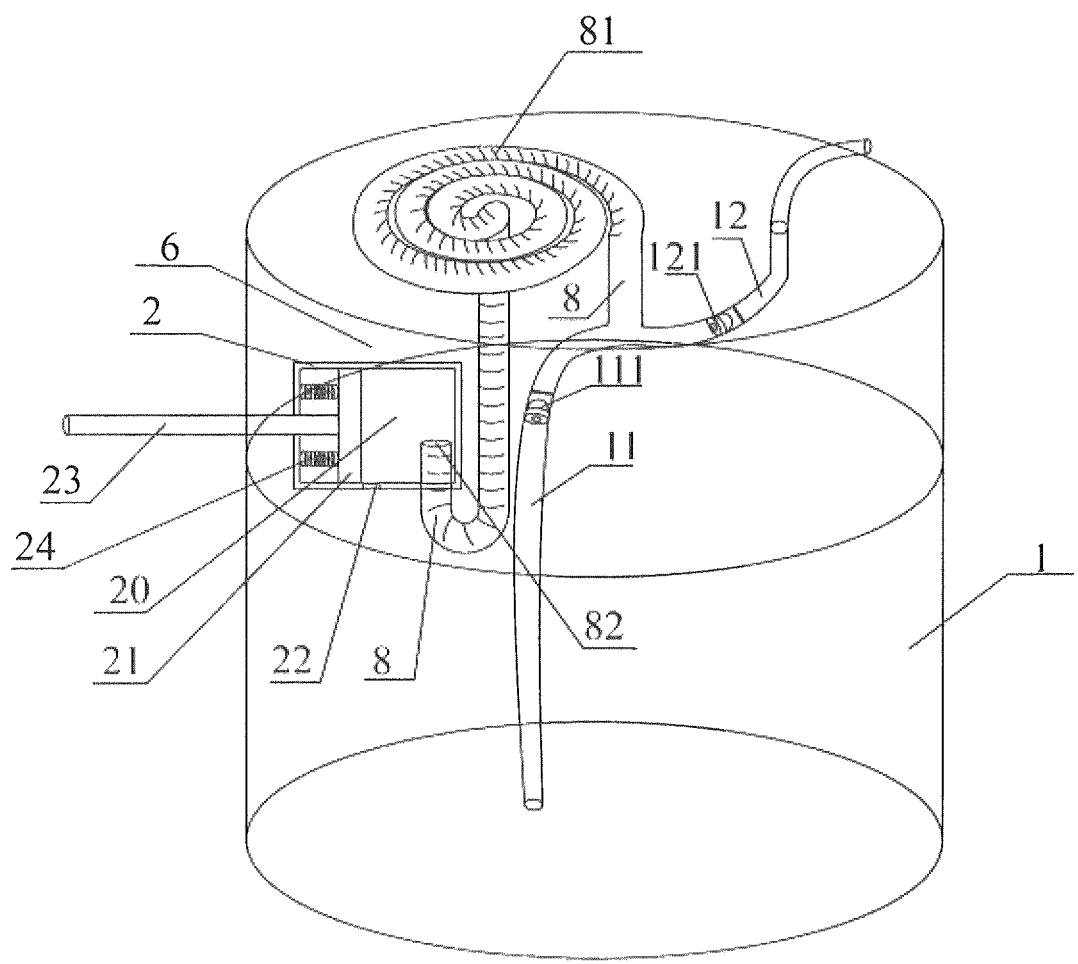
FIG. 6 is a schematic structural diagram of a liquid container according to Embodiment 6.

FIG. 6 is a schematic structural diagram of a liquid container according to Embodiment 6. In the container, a container body 1 for storing liquid is added to the tool for extracting liquid of Embodiment 5.

The same as the foregoing embodiments, such a container can directly measure and extract liquid inside the container body 1 without using an external tool, so that the liquid inside the container is rarely in contact with external air, is not oxidized, reduced, or contaminated by air or an external measuring tool, and is protected better. Measured-volume extraction is accurate, convenient, and fast.

Embodiment 7

Figure 7:
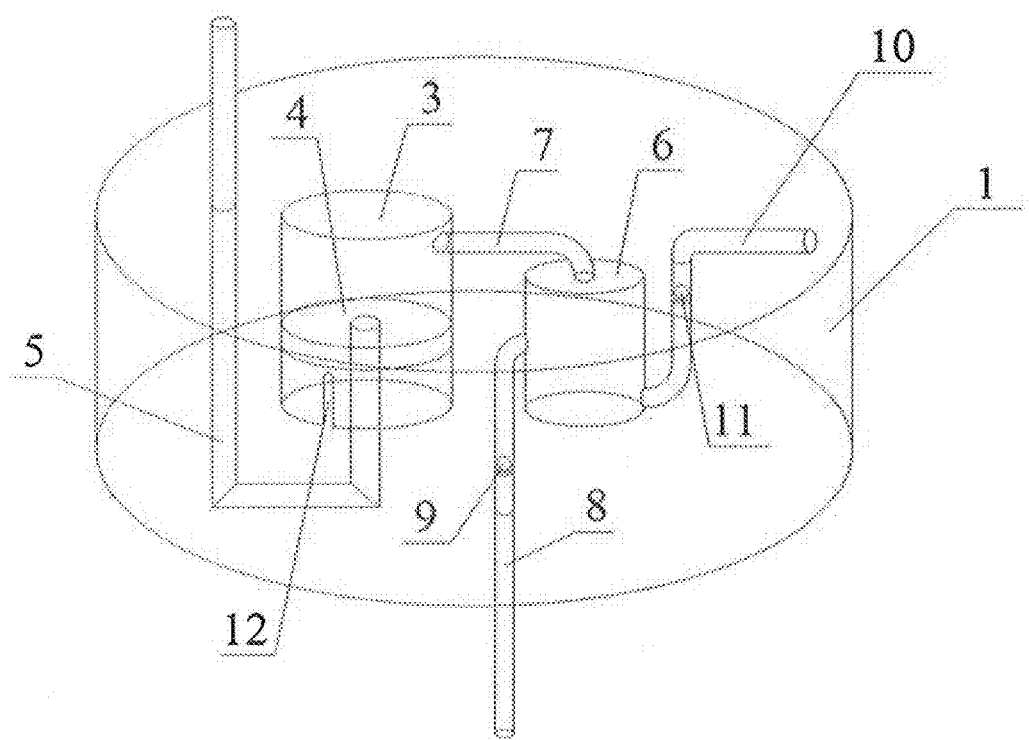
FIG. 7 is a schematic structural diagram of a tool for extracting liquid according to Embodiment 7.

FIG. 7 is a schematic structural diagram of a tool for extracting liquid according to Embodiment 7. The tool for extracting liquid includes a pressure variation apparatus, a liquid storage space 6, a liquid suction passage 8, and an outflow passage 10.

The pressure variation apparatus includes a pneumatic cylinder 3 and a piston 4. An axial notch, that is, an opening 12, running, through a pneumatic cylinder wall is disposed on a lower part of the pneumatic cylinder 3. When the piston 4 is located on an upper edge of the opening 12, a volume of a sealed part (that is, a volume of a part above the piston) inside the pneumatic cylinder 3 is larger than a volume of the liquid storage space 6. The piston 4 is connected to a pull rod 5, and the pull rod 5 extends out of the tool for extracting liquid.

An end of the liquid storage space 6 is a pipe 7, the other end thereof is in communication with the outflow passage 10, and a total capacity of the liquid storage space 6 is a determined value. The pipe 7 is a part of the liquid storage space 6, one end thereof extends into the pneumatic cylinder 3, and the other end thereof is in communication with another part of the liquid storage space 6.

A one-way valve 9 is disposed inside the liquid suction passage 8. The one-way valve 9 allows liquid below to enter into the liquid storage space 6, and does not allow the liquid to flow back.

A one-way valve 10 is disposed inside the outflow passage 10, and the one-way valve 10 only allows liquid to flow out of the tool for extracting liquid.

Steps of measuring and extracting liquid by using such a measuring tool are as follows:

When the piston 4 is above the upper edge of the opening 12, the pull rod 5 is pressed downward, and the piston 4 is pulled by the pull rod 5 to move downward. Pressure inside the pneumatic cylinder 3 is reduced. Pressure inside the liquid storage space 6 is negative pressure. The one-way valve 11 is closed, the one-way valve 9 is opened, liquid enters into the liquid storage space 6 from the liquid suction passage 8, and after the liquid storage space 6 is filled up, excess liquid enters into the pneumatic cylinder 3 through a port of the pipe 7.

The piston 4 exceeds the upper edge of the opening 12, air enters into the pneumatic cylinder 3, negative pressure inside the pneumatic cylinder 3 disappears, and liquid inside the liquid storage space 6 no longer flows. Excess liquid inside the pneumatic cylinder 3 flows out through the opening 12. The axial opening 12 enables excess liquid to has more sufficient time to flow out.

During liquid extraction, the pull rod 5 is pulled upward, and after exceeding the upper edge of the opening 12, the piston 4 increases pressure inside the pneumatic cylinder 3. Pressure inside the liquid storage space 6 is positive pressure. The one-way valve 9 is closed, the one-way valve 11 is opened, and liquid flows out along the outflow passage 10. If liquid inside the liquid storage space 6 is completely extracted, a volume of the extracted liquid is a capacity of the liquid storage space 6, and is a determined amount.

Such a measuring tool is convenient, fast, and accurate, and is convenient in daily use.

Embodiment 8

Figure 8:
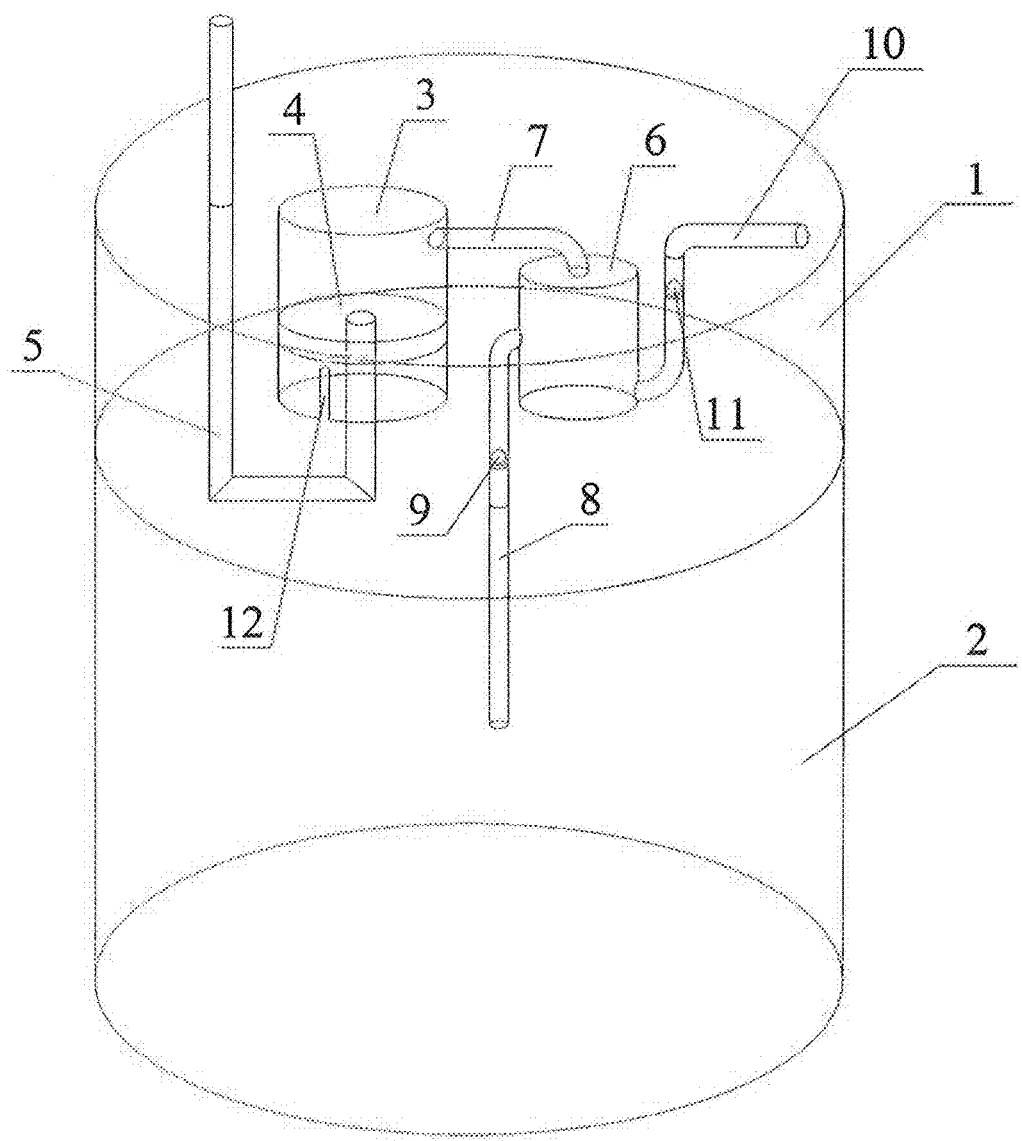
FIG. 8 is a schematic structural diagram of a liquid container according to Embodiment 8.

FIG. 8 is a schematic structural diagram of a liquid container according to Embodiment 8. In the container, a container body 2 for storing liquid is added to the tool 1 for extracting liquid of Embodiment 7.

Such a container can extract liquid inside the container body 2 in a determined volume without using an external tool, so that the liquid inside the container is rarely in contact with external air, is not oxidized, reduced, or contaminated by air or an external measuring tool, and is protected better. Measured-volume extraction is accurate, convenient, and fast.

Embodiment 9

Figure 9:
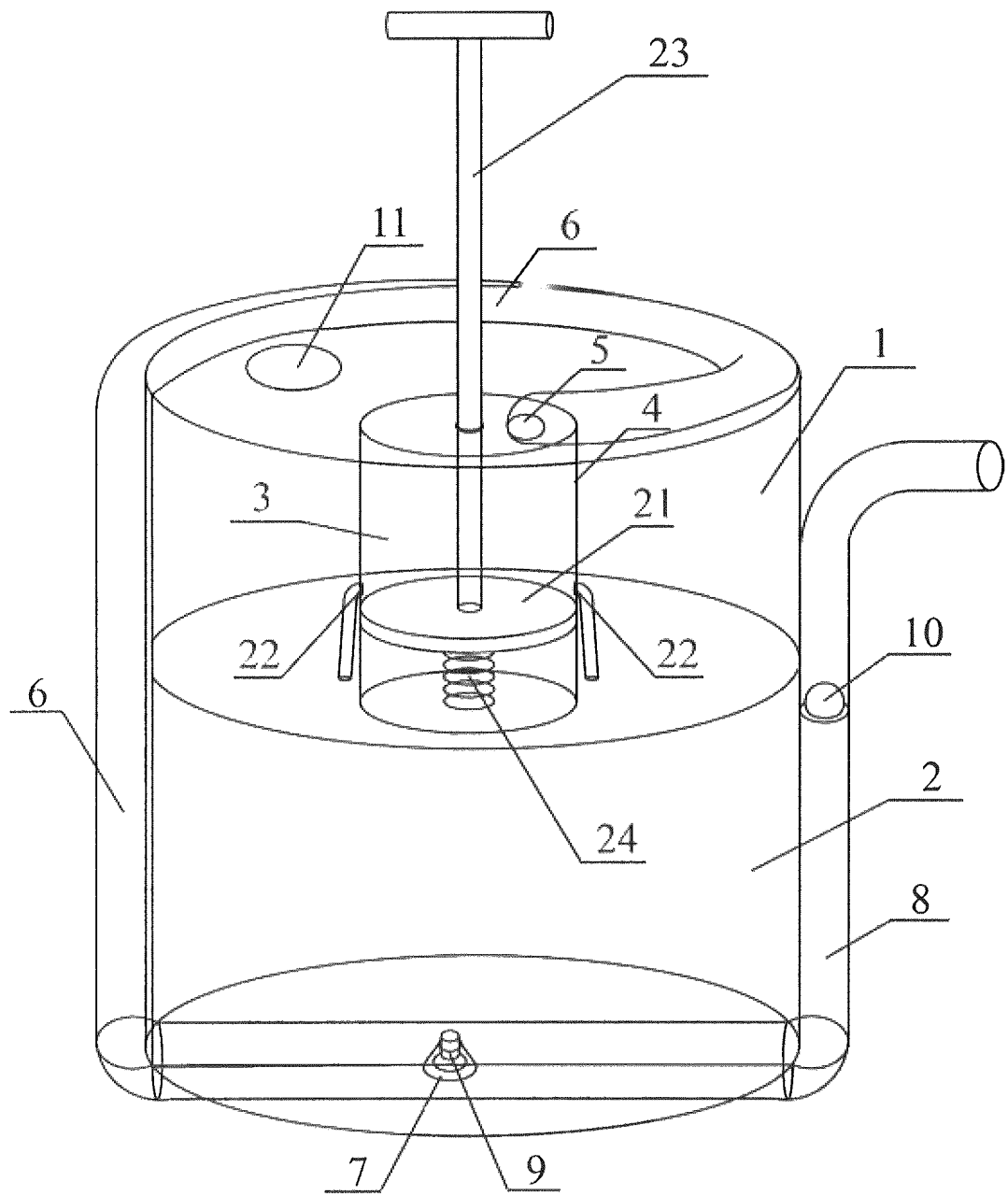
FIG. 9 is a schematic structural diagram of a liquid container according to Embodiment 9.

FIG. 9 is a schematic structural diagram of a liquid container according to Embodiment 9. The container includes a container body 1, a pressure variation apparatus, a liquid storage space 6, a liquid suction passage 7, and an outflow passage 8.

A filling port is arranged on the container body 1, and after filling, the port is sealed by using an air one-way valve 11 that only allows air to enter into the container body 1. Liquid 2 is held inside the container body 1.

The pressure variation apparatus includes a pneumatic cylinder 3 and a piston 21. An opening 22 connected to a liquid guide pipe is disposed on a lower part of the pneumatic cylinder 3. A volume (a volume of a sealed part) of a part above the opening 22 inside the pneumatic cylinder 3 is larger than a capacity of the liquid storage space 6. A top of the piston 21 is connected to a pull rod 23, the pull rod 23 penetrates through the pneumatic cylinder 3 to extend out of the container, and an interface between the pull rod 23 and the pneumatic cylinder wall 4 is provided with an air-tight, seal. A spring 24 is mounted on a lower side of the piston 21, and the spring 24 enables the piston 23 to automatically return to its original position after it deviates from a specified position.

A starting end 5 of the liquid storage space 6 is opened on an upper part of the pneumatic cylinder 3, the liquid storage space 6 is coiled around an edge of an upper surface of the container for nearly a round, goes downward along a sidewall of the container body 1, and then, enters into a bottom of the container body 1. At the bottom of the container body 1, the other end (a terminal end) of the liquid storage space 6 is in communication with the liquid suction passage 7 and the outflow passage 8.

The liquid suction passage 7 is extremely short, is merely an opening on the terminal end of the liquid storage space 6, and is provided with a one-way valve 9 inside. The one-way valve 9 allows liquid 2 inside the container body 1 to enter into the liquid storage space 6, and does not allow the liquid to flow back.

The outflow passage 8 is in communication with the liquid storage space 6, and is provided with a one-way valve 10 inside. The one-way valve 10 only allows liquid to flow out.

Steps of measuring and extracting the liquid 2 inside the container body 1 include the following:

If the liquid storage space 6 is filled up with liquid, and the piston is located a position as shown in FIG. 9, the pull rod 23 is pulled upward to exceed a position of the opening 22, to increase pressure inside the pneumatic cylinder 3. Pressure inside the liquid storage space 6 is positive pressure. The one-way valve 9 is closed, the one-way valve 10 is opened, and liquid inside the liquid storage space 6 flows out of the outflow passage 8. A volume of liquid that flows out can be read from a scale corresponding to a liquid surface inside the liquid storage space.

After the extraction is completed, pulling the pull rod 23 is stopped, the piston 21 returns to its original position under the action of the spring 24, and the piston 21 is pulled downward to reduce pressure inside the pneumatic cylinder 3. Pressure inside the liquid storage space 6 is negative pressure. The one-way valve 10 is closed, the one-way valve 9 is opened, and the liquid 2 inside the container body 1 enters into the liquid storage space 6 from the liquid suction passage 7. After the liquid storage space 6 is filled up with liquid, excess liquid enters into the pneumatic cylinder 3. The piston 21 continuously moves downward to exceed the opening 22, negative pressure disappears, and excess liquid inside the pneumatic cylinder 3 flows out through the opening 22 to flow back into the container body 1. After the piston 21 returns to its original position, liquid inside the liquid storage space 6 stops moving, initial positioning is completed, and the container is ready for next extraction.

If the liquid storage space 6 is not fully filled with liquid, and the piston 21 is located above the opening 22, it needs to first push the pull rod 23 downward to move the piston 21 downward, so as to fill up the liquid storage space 6 with liquid, complete initial positioning, and then perform measured-volume extraction.

Such a container can directly measure and extract liquid inside the container body. Existence of the one-way valve 11 makes the liquid 2 in contact with an extremely small amount of external air, and liquid inside the container is not oxidized, reduced, or contaminated by air or an external measuring tool, and is protected better. Measured-volume extraction is also accurate, convenient, and fast.

Embodiment 10

Figure 10:
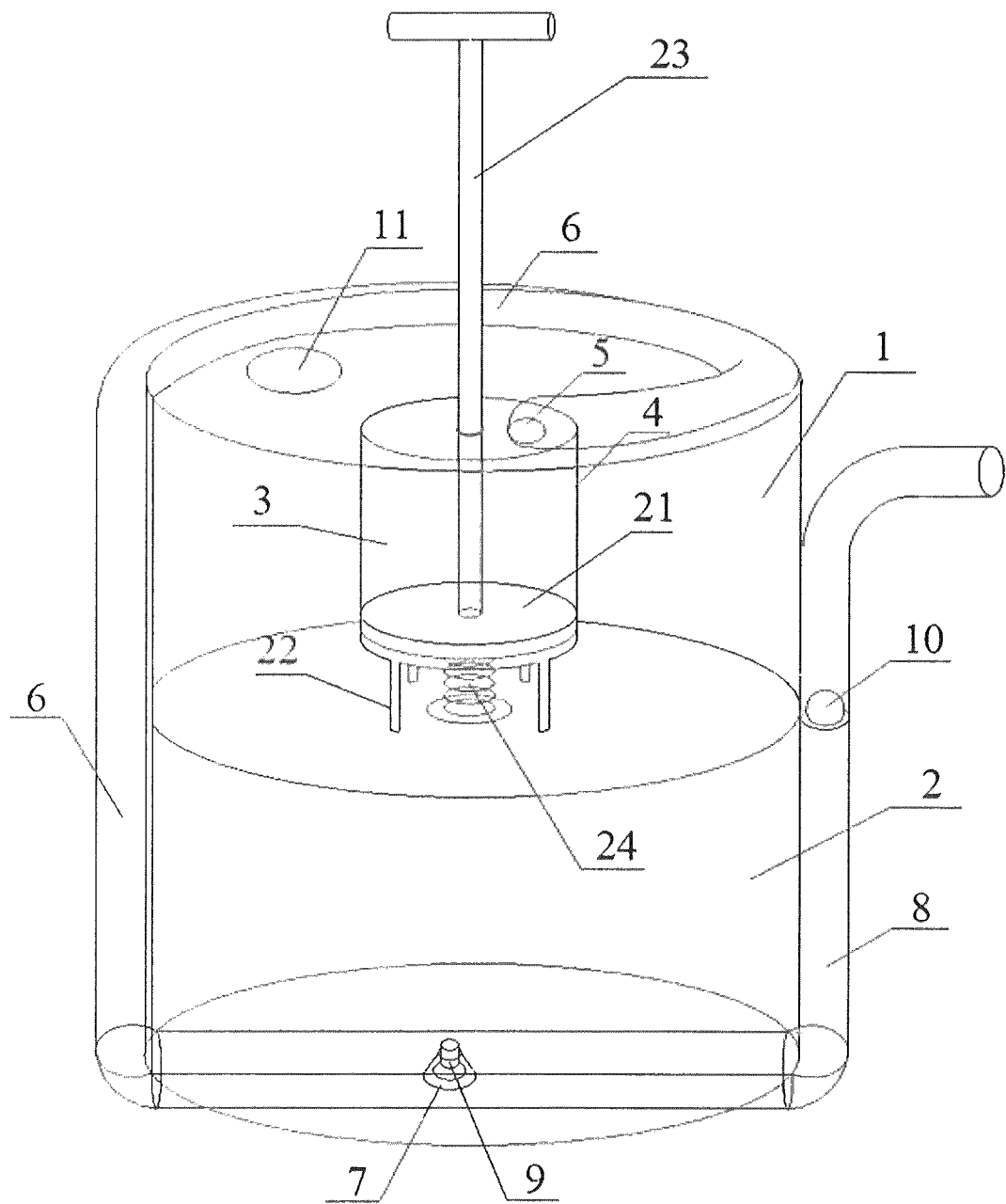
FIG. 10 is a schematic structural diagram of a liquid container according to Embodiment 10.

FIG. 10 is a schematic structural diagram of a liquid container according to Embodiment 10. Upon comparison, this embodiment differs from Embodiment 9 in respect of: four supports 22 below the pneumatic cylinder 3 that support the piston 21 to reciprocate after the piston 21 departs from a sealed part of the pneumatic cylinder 3. Huge gaps between the four supports 22 are equivalent to an opening in Embodiment 9, and implement a function of communicating with and sealing air and liquid inside the pneumatic cylinder 3. The four supports 22 are parts of a wall of the pneumatic cylinder 3, other than the opening. A volume (a volume of a sealed part) of a part on tops of the four supports 22 inside the pneumatic cylinder 3 is larger than a capacity of the liquid storage space 6. Using the supports 22 can reduce costs to some extent and facilitate mounting and maintaining the piston. Communication between air and liquid inside the pneumatic cylinder 3 and air and liquid outside the pneumatic cylinder 3 is smoother.

Embodiment 11

Figure 11:
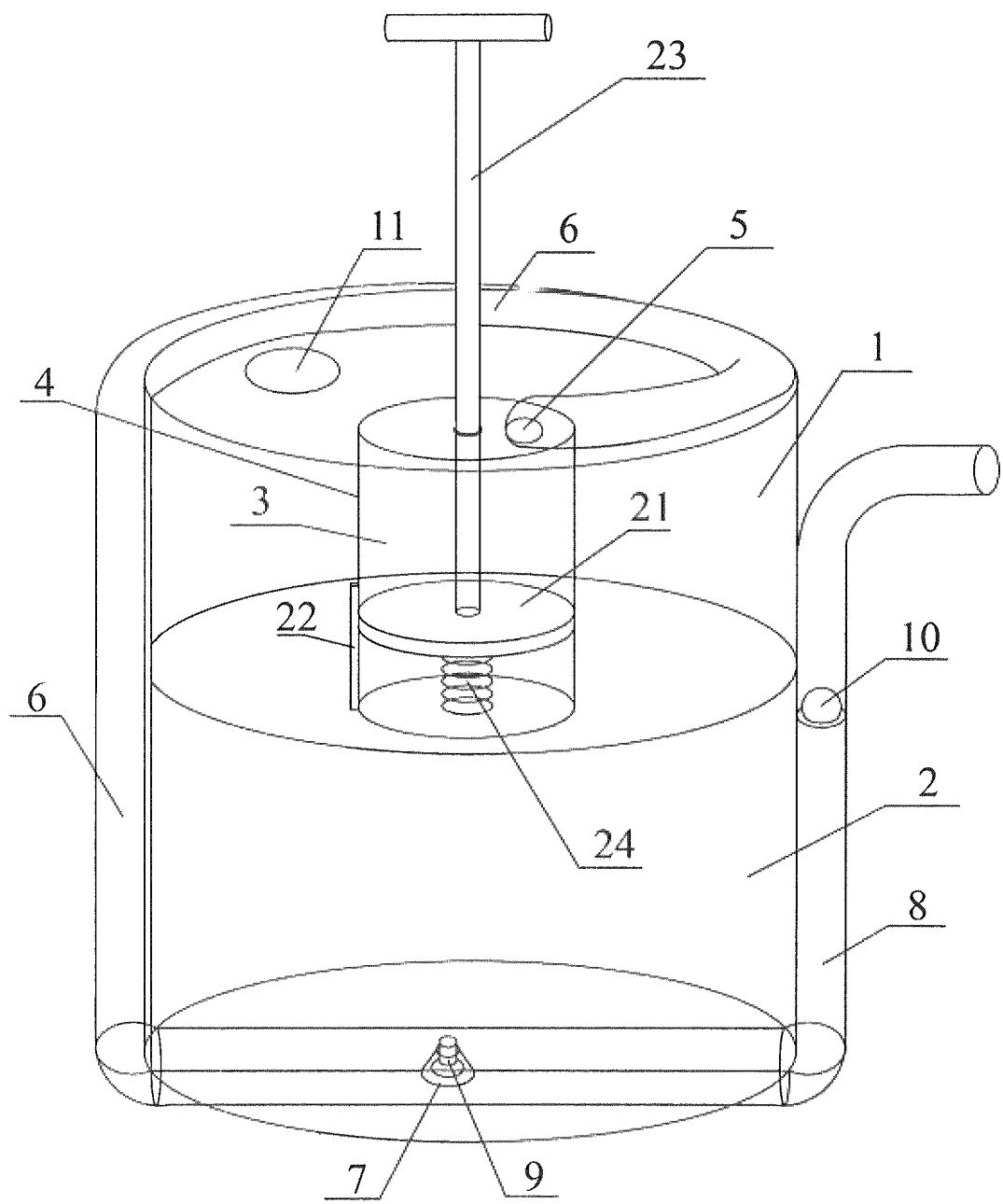
FIG. 11 is a schematic structural diagram of a liquid container according to Embodiment 11.

FIG. 11 is a schematic structural diagram of a liquid container according to Embodiment 11. Upon comparison. the container differs from Embodiment 9 in that no opening connected to a liquid guide pipe is arranged on a lower part of a pneumatic cylinder 3, and instead, a groove 22 is arranged along an axial direction on an inner side of a lower part of a pneumatic cylinder wall 4, and the groove 22 is opened in a direction toward an interior of the pneumatic cylinder 3. A principle of this embodiment is the same as those of Embodiment 9 and Embodiment 10. The groove 22 is equivalent to an opening plus a liquid guide pipe or gaps between supports, and may lead liquid inside the pneumatic cylinder 3 to the outside of the pneumatic cylinder. A part of the groove 22 inside the pneumatic cylinder 3 is equivalent to an opening whose size is changed as the piston 21 moves.

Compared with the foregoing other openings, the groove 22 can lubricate the piston to some extent.

Embodiment 12

Figure 12:
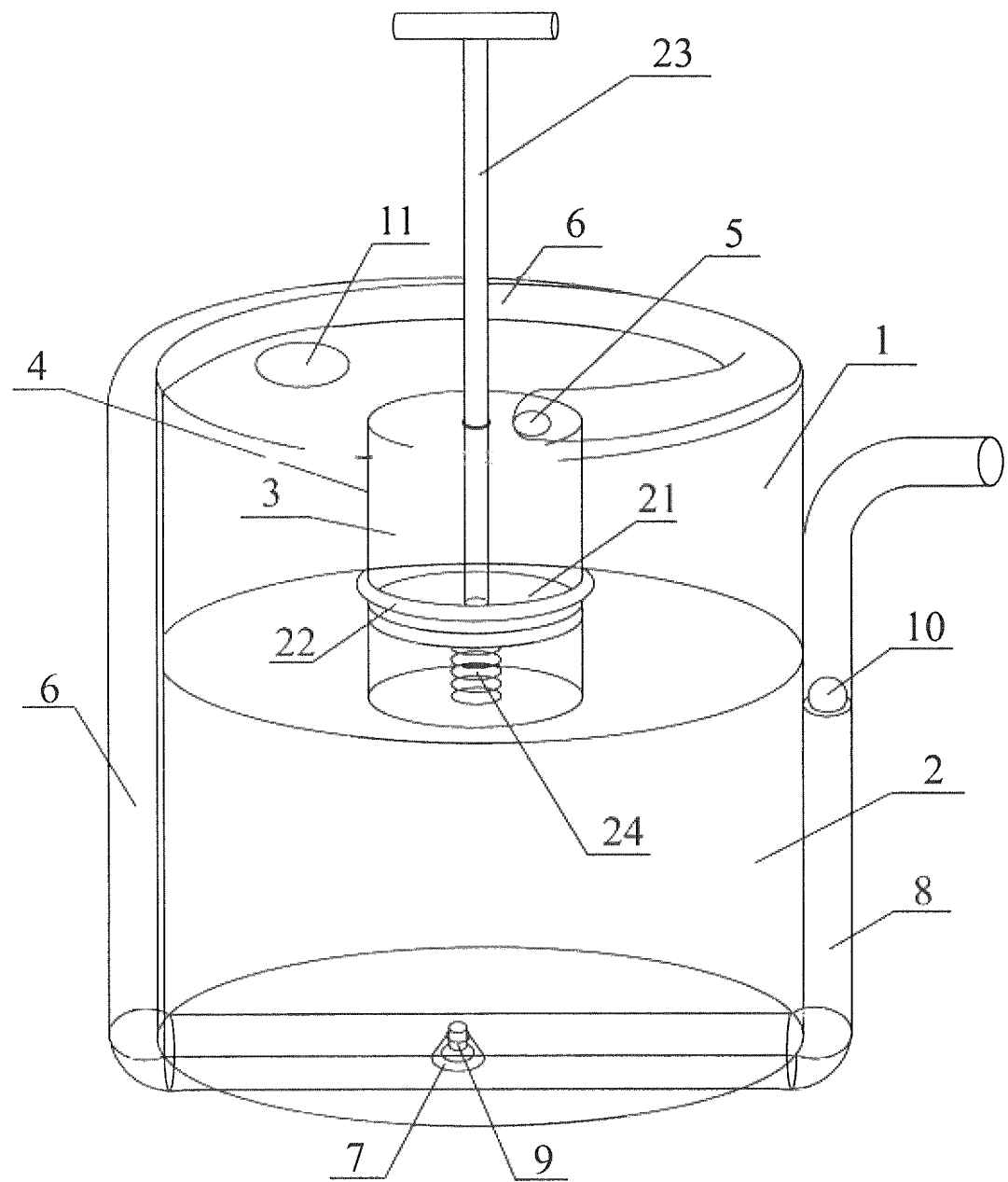
FIG. 12 is a schematic structural diagram of a liquid container according to Embodiment 12.

FIG. 12 is a schematic structural diagram of a liquid container according to Embodiment 12. Upon comparison, the container differs from Embodiment 9 in that no opening connected to a liquid guide pipe is arranged on a lower part of a pneumatic cylinder 3, and instead, a temporary storage groove 22 is arranged along a radial direction on the lower part of the pneumatic cylinder 3. The temporary storage groove 22 is opened in a direction toward an interior of the pneumatic cylinder 3, and can accommodate excess liquid that flows into the pneumatic cylinder 3.

Steps of measuring and extracting the liquid 2 inside the container body 1 include the following:

If the liquid storage space 6 is filled up with liquid, and the piston is located a position as shown in FIG. 12, the pull rod 23 is pulled upward to exceed a position of the temporary storage groove 22, to increase pressure inside the pneumatic cylinder 3. Pressure inside the liquid storage space 6 is positive pressure. The one-way valve 9 is closed, the one-way valve 10 is opened, and liquid inside the liquid storage space 6 flows out of the outflow passage 8. A volume of liquid that flows out can be read from a scale corresponding to a liquid surface inside the liquid storage space. Liquid inside the temporary storage groove 22 flows out of the temporary storage groove 22 under the action of gravity, and enters into the container body 1.

After the extraction is completed, pulling the pull rod 23 is stopped, the piston 21 returns to its original position under the action of the spring 24, and the piston 21 is actuated downward to reduce pressure inside the pneumatic cylinder 3. Pressure inside the liquid storage space 6 is negative pressure. The one-way valve 10 is closed, the one-way valve 9 is opened, and the liquid 2 inside the container body 1 enters into the liquid storage space 6 from the liquid suction passage 7. After the liquid storage space 6 is filled up with liquid, excess liquid enters into the pneumatic cylinder 3. The piston 21 continuously moves downward to exceed the temporary storage groove 22, and excess liquid enters into the temporary storage groove 22. Liquid inside the liquid storage space 6 stops moving, initial, positioning is completed, and the container is ready for next extraction.

If the liquid storage space 6 is not fully filled with liquid, it needs to first complete initial positioning, and then perform extraction by increasing pressure.

The container of this embodiment can also directly measure and extract liquid inside the extraction container body and protect liquid inside the container better. Measured-volume extraction is fast, convenient, and accurate.

Embodiment 13

Figure 13:
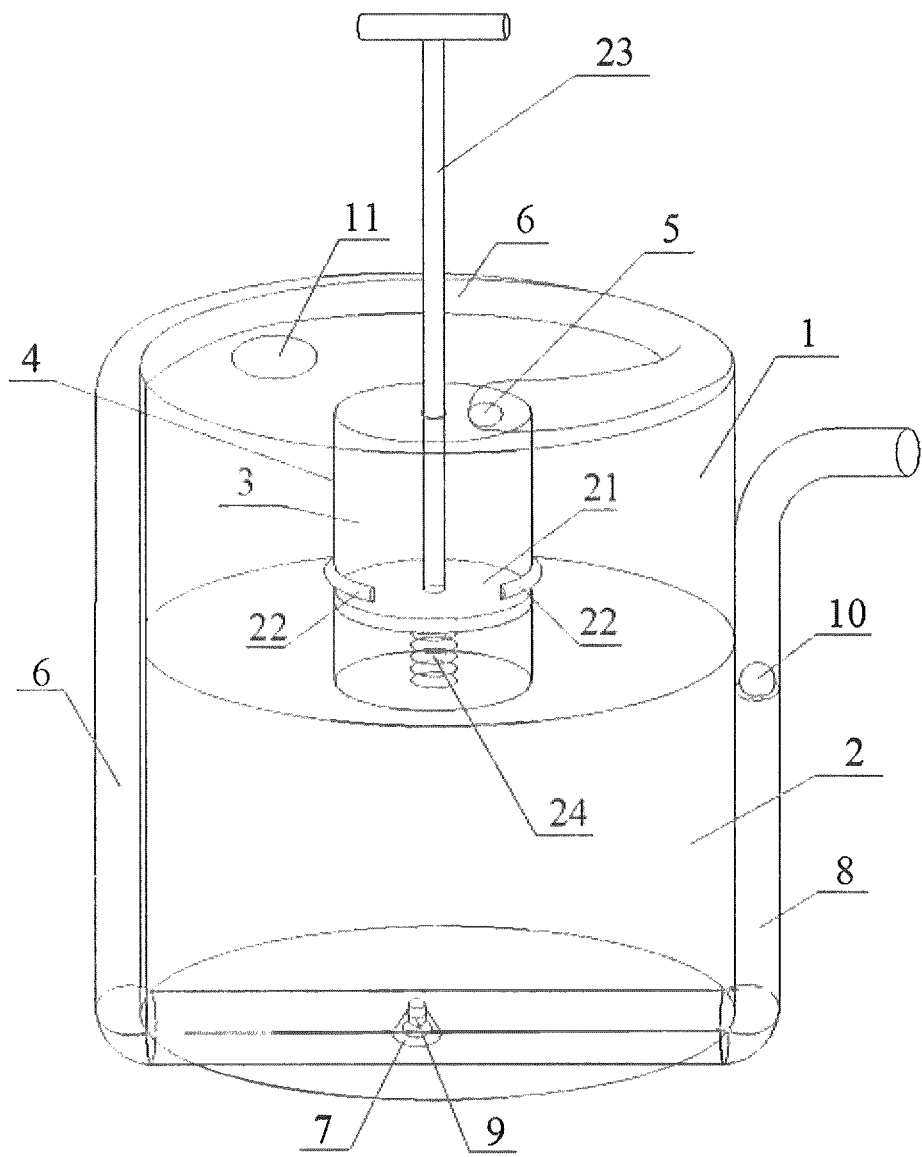
FIG. 13 is a schematic structural diagram of a liquid container according to Embodiment 13.

FIG. 13 is a schematic structural diagram of a liquid container according to Embodiment 13. Upon comparison, the container differs from Embodiment 12 in that a plurality of non-consecutive temporary storage grooves 22 is arranged the a lower part of the pneumatic cylinder 3. The temporary storage grooves 22 are opened in a direction toward the interior of the pneumatic cylinder 3, and can accommodate excess liquid that flows into the pneumatic cylinder 3. The non-consecutive temporary storage grooves 22 can prevent reciprocation of the piston from being affected and make the reciprocation of the piston smoother.

Steps of measuring and extracting the liquid 2 inside the container body 1 are the same as those in Embodiment 12.

Similarly, the temporary storage groove can be discretely distributed on the lower part of the pneumatic cylinder 3. The discretely distributed temporary storage grooves can lubricate the piston better.

In Embodiment 12 and Embodiment 13, a liquid guide pipe may be disposed at the bottom of the pneumatic cylinder 3, to guide liquid that flows out of the temporary storage groove to flow to a proper position.

Embodiment 14

Figure 14:
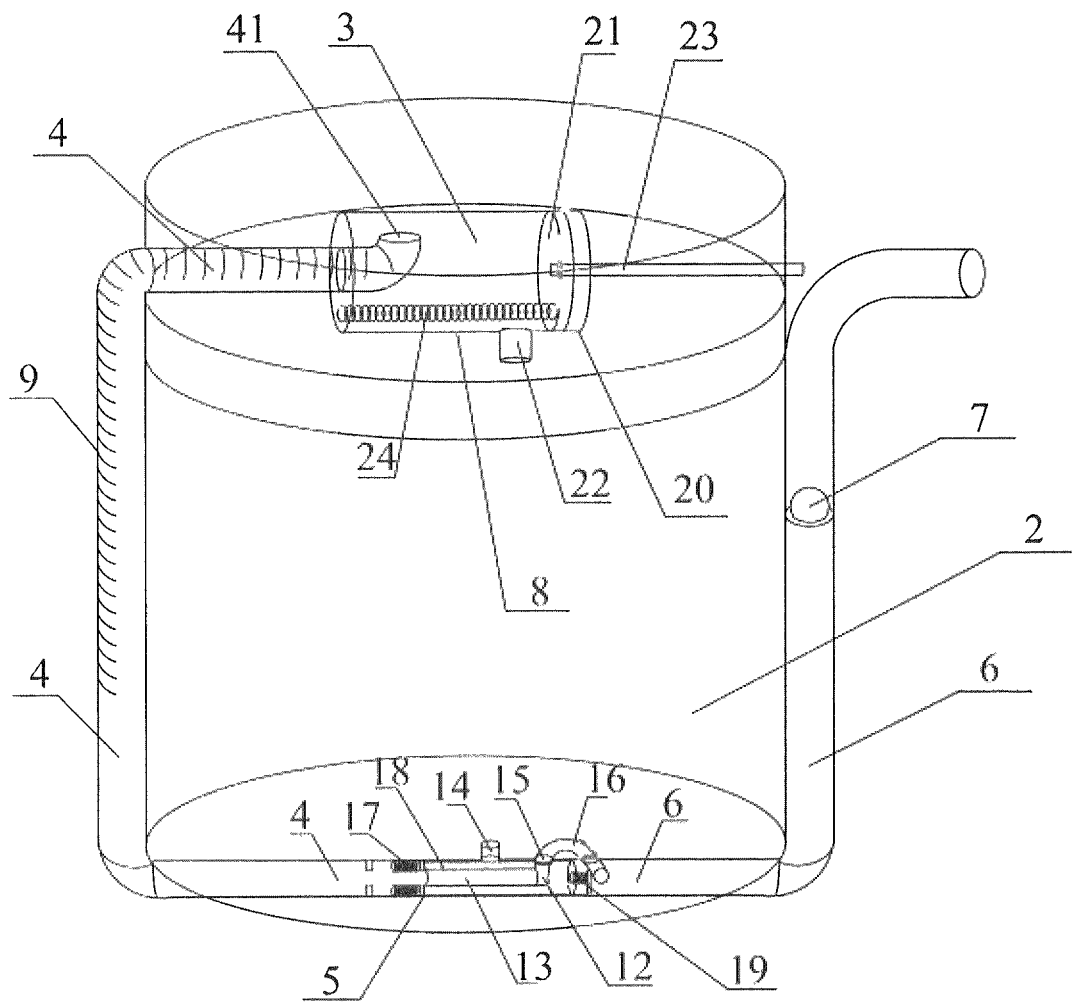
FIG. 14 is a schematic structural diagram of a liquid container according to Embodiment 14.

FIG. 14 is a schematic structural diagram of a liquid container according to Embodiment 14. The container body 2 is cylindrical and holds liquid inside, and in addition, further includes a pressure variation apparatus 3, a liquid storage space 4, a liquid suction passage 14, and an outflow passage.

The pressure variation apparatus 3 includes a pneumatic cylinder 20 and a piston 21, and the pneumatic cylinder 20 can generate a pressure variation as the piston 21 moves. An opening 22 is arranged at a lower part of a pneumatic cylinder wall 8, the piston 21 is connected to a pull rod 23, and the pull rod 23 extends out of the container body 2. A spring 24 is connected to the piston and the pneumatic cylinder wall 8, and can pull the piston 21 to return to its original position after the piston 21 deviates from a balancing point. When the piston 21 is located at a position of the opening 22, a volume of a sealed part inside the pneumatic cylinder 20 is larger than a capacity of the liquid storage space 4.

A port of a starting end 41 of the liquid storage space 4 is upward, and is located inside the pneumatic cylinder 3. The liquid storage space 4 has a scale 9. The other end of the liquid storage space 4 is in communication with a control valve.

The control valve includes a valve body 5 and a valve core 18. A tail end of the liquid storage space 4 is in communication with the valve body 5 of the control valve seamlessly, and the valve core 18 can move leftward and rightward inside the valve body 5 under the action of pressure transferred by the liquid storage space 4. The valve 5 is provided with two interfaces, namely, an interface 14 and an interface 15. The interface 14 is in communication with the liquid suction passage, and leads into a container body 1. The interface 15 is in communication with an outflow passage constituted by a pipe 16 and a pipe 6. An internal passage in the middle of the valve core 18 is provided with an interface 12, and the interface 12 leads to an inner surface of the valve body 5, and can be in communication with the interface 14 or the interface 15. A spring 17 and a spring 19 can return the valve body 18 to its original position. When the valve core 18 is at a balancing point, the interface 12 is not in communication with the interface 14 or the interface 15. A one-way valve 7 that only allows liquid to flow out of the container is disposed inside the pipe 6.

Steps of extracting content inside such a container are as follows:

The pull rod 23 is pushed inward, to move the piston 21 leftward, and after the piston 21 exceeds the opening 22 arranged on the pneumatic cylinder wall 8, positive pressure is generated inside the pneumatic cylinder 20, to increase pressure inside the liquid storage space 4.

The valve core 18 inside the control valve moves rightward under the pressure from a side of the liquid storage space 4, to communicate the interface 12 with the interface 15, where liquid inside the liquid storage space 4 flows outward along the pipe 16 and the pipe 6. A liquid surface inside the liquid storage space is observed, and a volume of extracted liquid is read. Pushing the pull rod 23 is stopped after a required volume is reached. The valve core 18 inside the control valve moves leftward under the action of the spring 17 and the spring 19, and the interface 12 and the interface 15 are staggered.

The piston 21 moves rightward under the action of the spring 24. Negative pressure is generated inside the pneumatic cylinder 20, to transfer the negative pressure into the liquid storage space 4. The valve core 18 inside the control valve moves leftward under the action of the negative pressure from the side of the liquid storage space 4, to communicate the interface 12 with the interface 14, where liquid inside the container body 2 enters into the liquid storage space 4 through the interface 14 and the internal passage 13. After the liquid storage space 4 is filled up, excess liquid enters the pneumatic cylinder 3. The piston 21 continuously move rightward, and after the piston 21 exceeds the opening 22 arranged on the pneumatic cylinder wall 8, negative pressure inside the pneumatic cylinder 3 disappears, liquid is stopped from entering the liquid storage space 4, and initial positioning is completed. The excess liquid that enters into the pneumatic cylinder 3 flows out through the opening 22. The valve core 18 inside the control valve moves rightward under the action of the spring 17 and the spring 19, and the interface 12 and the interface 14 are staggered.

In this case, the container is ready for next extraction.

Although several embodiments of the present invention are illustrated and described, it can be understood by a person of ordinary skill in the art that various changes, amendments, replacements, variations, and recombination can be made on related technologies of the embodiments without departing from the principle and spirit of the present invention. The scope of the present invention is defined by the attached claims and equivalent technical solutions.

What is claimed is:

1. A tool for extracting liquid, comprising: a pressure variation apparatus, a liquid storage space, a liquid suction passage, and an outflow passage, wherein:
   the pressure variation apparatus comprises a pneumatic cylinder and a piston capable of reciprocating inside the pneumatic cylinder; the piston reciprocates to generate positive and negative pressure variations inside the pneumatic cylinder; a starting end of the liquid storage space is in communication with an interior of the pneumatic cylinder;
   a temporary storage groove or an opening is arranged on a pneumatic cylinder wall whose horizontal position is lower than a port of the starting end of the liquid storage space, wherein the temporary storage groove is configured to temporarily store excess liquid that enters into the pneumatic cylinder;
   a maximum volume of a sealed part of the pneumatic cylinder is larger than a volume of the liquid storage space;
   the liquid suction passage is in communication with the liquid storage space, and a valve capable of being opened toward a direction of the liquid storage space and being closed toward an opposite direction is disposed inside the liquid suction passage; and
   the outflow passage is in communication with a tail end of the liquid storage space, and a valve capable of being opened toward a direction of an external space and being closed toward an opposite direction is disposed inside the outflow passage.

2. The tool for extracting liquid according to claim 1, wherein the opening is located on an inner surface of the pneumatic cylinder, or is an axial notch running through the pneumatic cylinder wall, or is a gap between piston motion supports.

3. The tool for extracting liquid according to claim 1, wherein the temporary storage grooves are radially annularly arranged on an inner surface of the pneumatic cylinder, or are discretely distributed on an inner surface of the pneumatic cylinder.

4. The tool for extracting liquid according to claim 1, wherein the starting end of the liquid storage space is in communication with the interior of the pneumatic cylinder through an inverted-U-shaped pipe.

5. The tool for extracting liquid according to claim 1, wherein the port of the starting end of the liquid storage space is upward.

6. The tool for extracting liquid according to claim 1, wherein the liquid storage space is a pipe marked with a volume scale or a space having a determined capacity.

7. A liquid container, comprising: a container body, a pressure variation apparatus, a liquid storage space, a liquid suction passage, and an outflow passage, wherein:
   the pressure variation apparatus comprises a pneumatic cylinder and a piston capable of reciprocating inside the pneumatic cylinder; the piston reciprocates to generate positive and negative pressure variations inside the pneumatic cylinder; a starting end of the liquid storage space is in communication with an interior of the pneumatic cylinder;
   a temporary storage groove or an opening is arranged on a pneumatic cylinder wall whose horizontal position is lower than a port of the starting end of the liquid storage space, wherein the temporary storage groove is configured to temporarily store excess liquid that enters into the pneumatic cylinder;
   a maximum volume of a sealed part of the pneumatic cylinder is larger than a volume of the liquid storage space;
   the liquid suction passage is in communication with the liquid storage space, and a valve capable of being opened toward a direction of the liquid storage space and being closed toward an opposite direction is disposed inside the liquid suction passage; and
   the outflow passage is in communication with a tail end of the liquid storage space, and a valve capable of being opened toward a direction of an external space and being closed toward an opposite direction is disposed inside the outflow passage.

8. The liquid container according to claim 7, wherein excess liquid inside the pneumatic cylinder is lead into the container body through a liquid guide pipe.

9. A method for extracting liquid, comprising the following steps:
   A. pulling a piston of a pneumatic cylinder outward, to generate negative pressure, to enable the pneumatic cylinder to apply negative pressure into a liquid storage space in communication with an upper part of the pneumatic cylinder, so that liquid enters into the liquid storage space through a liquid suction passage provided with a valve capable of being opened toward a direction of the liquid storage space and being closed toward an opposite direction;
   B. after the liquid storage space is filled up with the liquid, departing, by excess liquid, from the liquid storage space to enter into the pneumatic cylinder;
   C. when the piston exceeds a position of a temporary storage groove disposed on a pneumatic cylinder wall, entering, by the excess liquid inside the pneumatic cylinder, into the temporary storage; and stopping pulling the piston, wherein excess liquid no longer enters the pneumatic cylinder, wherein the temporary storage groove is configured to temporarily store excess liquid that enters into the pneumatic cylinder;

the position of the temporary storage groove makes a maximum volume of a sealed part of the pneumatic cylinder larger than a volume of the liquid storage space;

D. pushing the piston inside the pneumatic cylinder inward, to enable the piston to move in an opposite direction to exceed the position of the temporary storage groove, wherein liquid inside the temporary storage groove flows out; and E. continuously pushing the piston to compress the pneumatic cylinder, to apply positive pressure into the liquid storage space, so that liquid inside the liquid storage space flows out through an outflow passage provided with a valve capable of being opened toward a direction of an external space and being closed toward an opposite direction, wherein a volume of the liquid that flows out is determined by using a position of a liquid surface inside the liquid storage space.

* * * * *